Patented Jan. 2, 1951

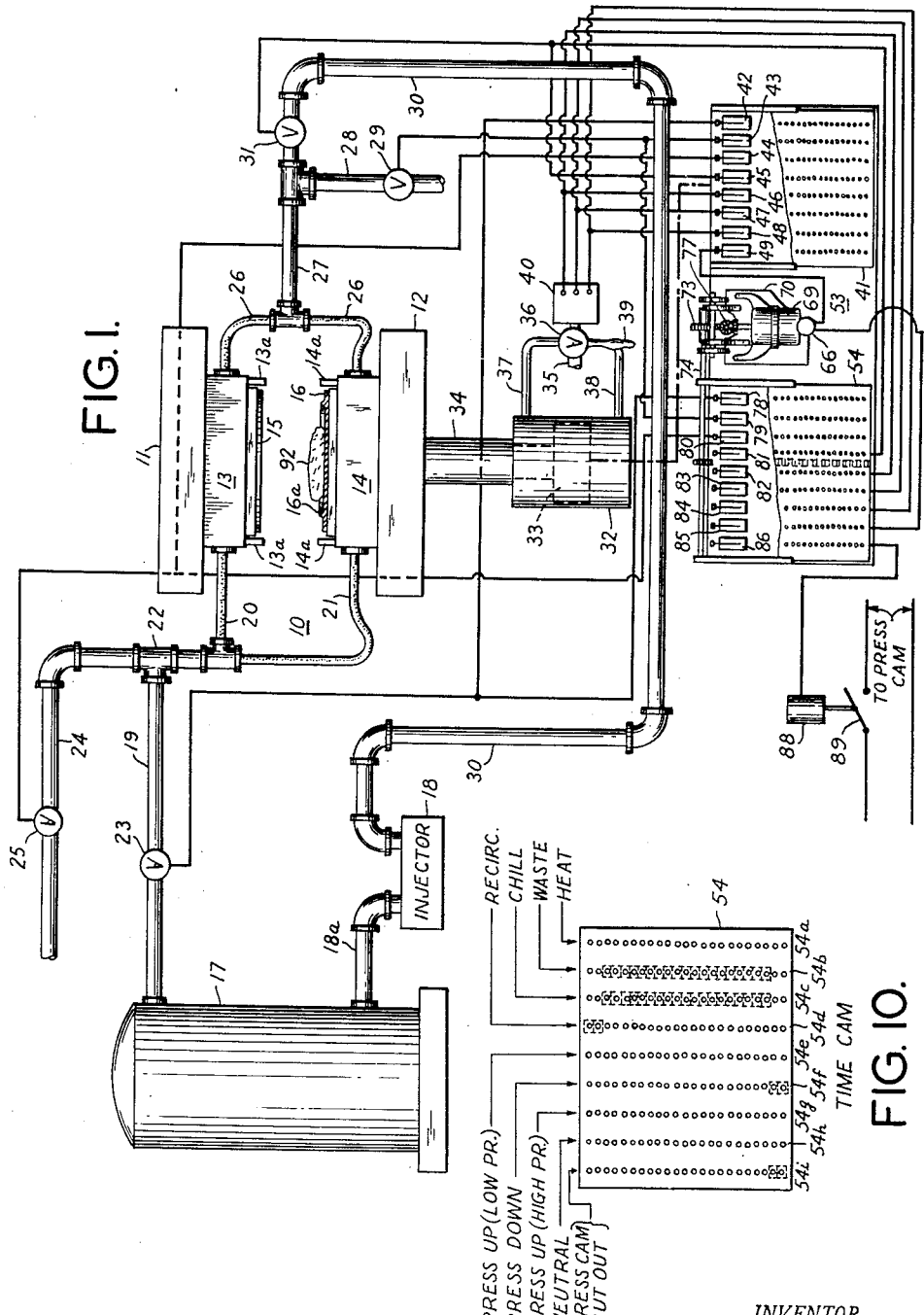

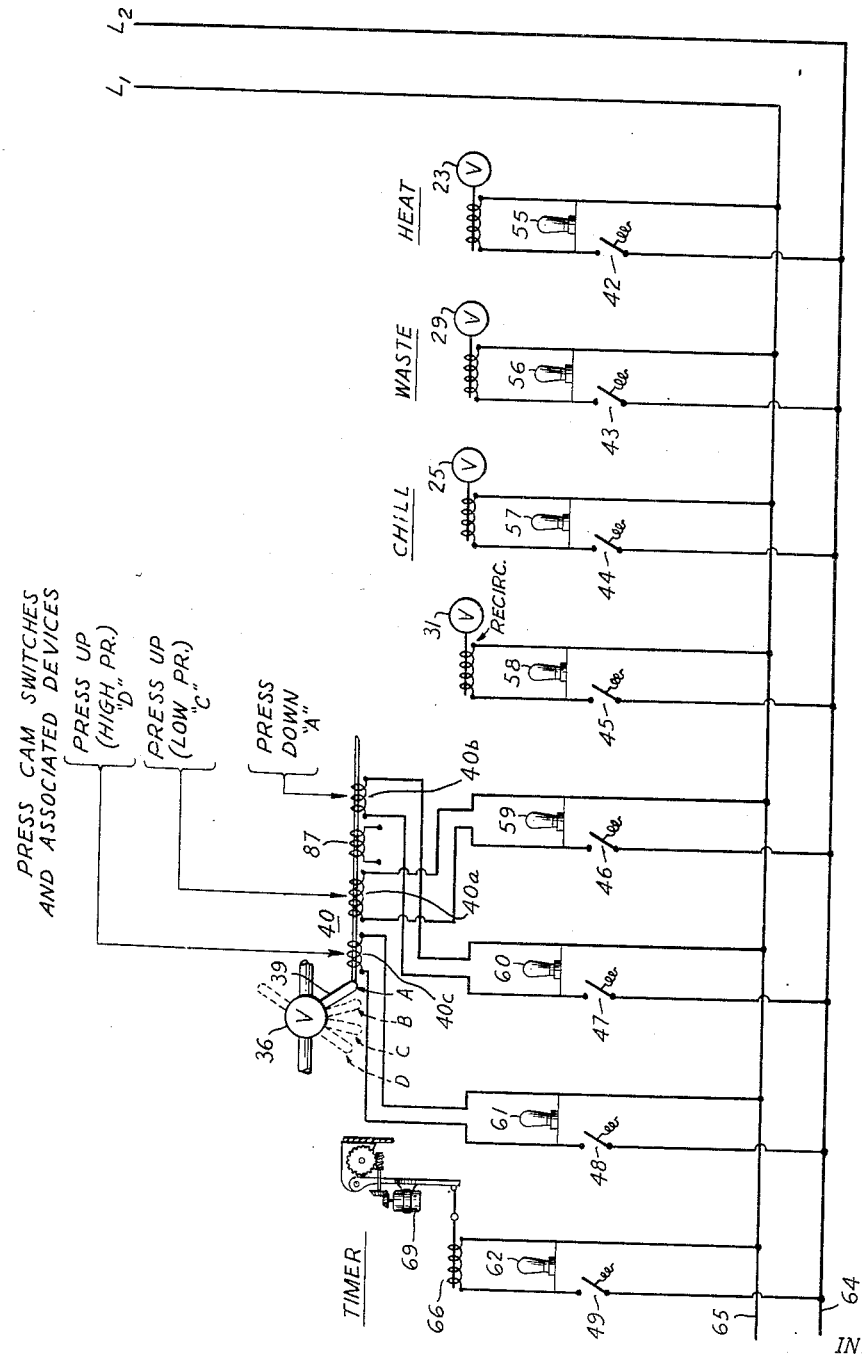

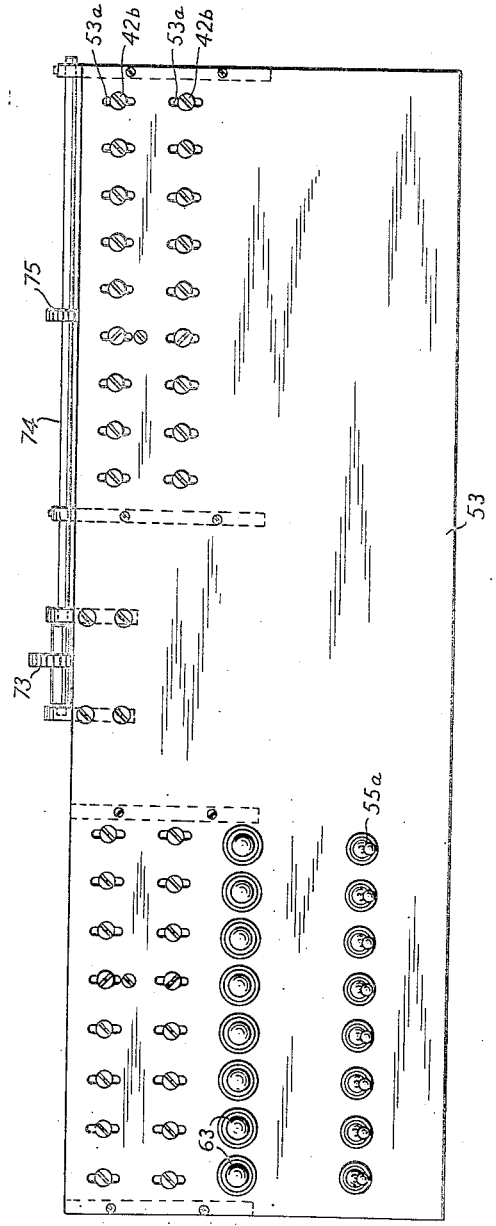
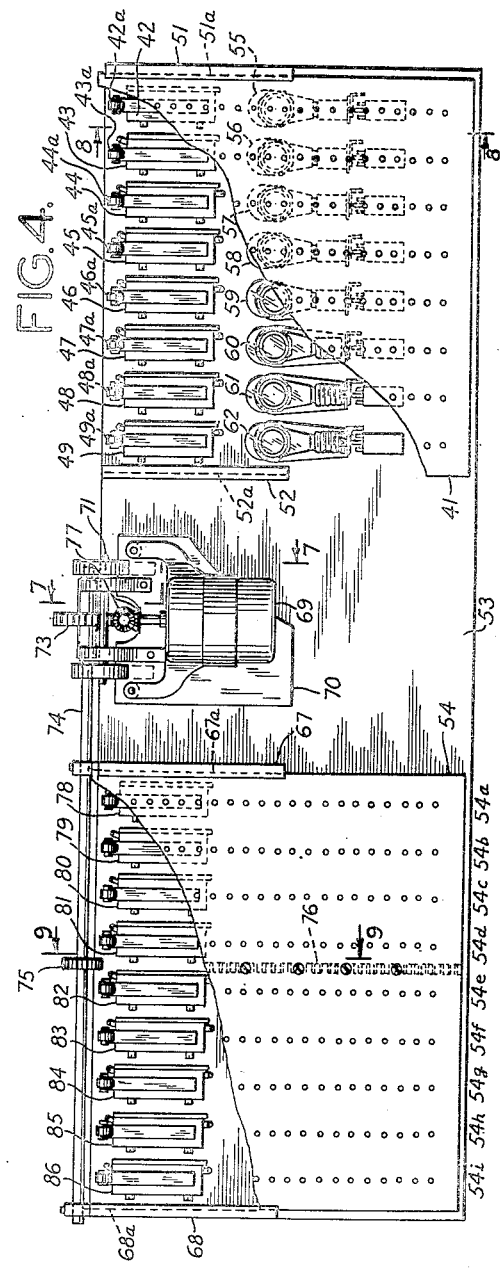

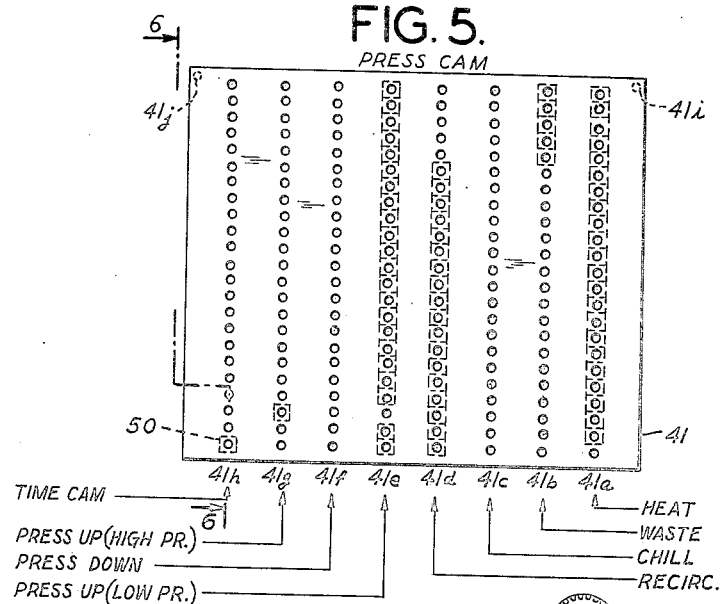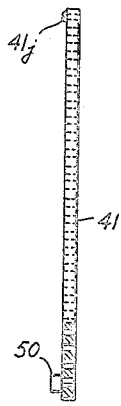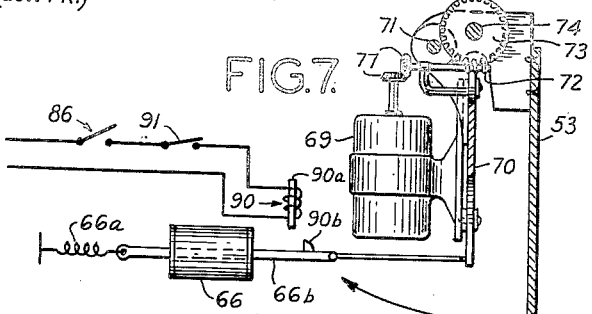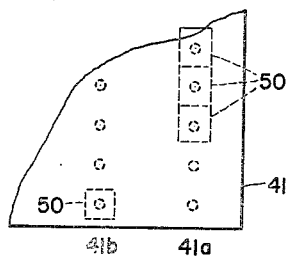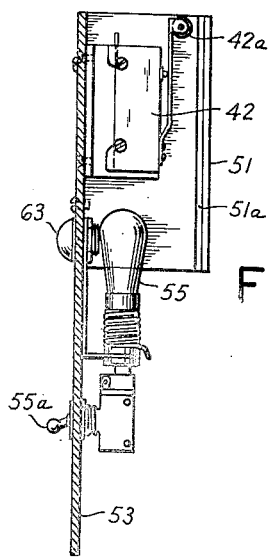

2,536,506

UNITED STATES PATENT OFFICE 2,536,506

PLASTIC MOLD CYCLE CONTROL APPARATUS

Jackson O. Kleber, Long Island City, N. Y.

Application January 22, 1948, Serial No. 3,792

14 Claims. (Cl. 18—17)

This invention relates to plastic molding apparatus, and more particularly to improvements in means for controlling a molding cycle.

Apparatus for pressing and molding plastic substances which have been suggested in the past have required expensive and complicated devices for controlling the various molding factors, such as heating, chilling and press position. Moreover, these prior devices have been unable to control a molding cycle without occasional costly delays and have necessitated the use of skilled labor which has increased considerably the cost of the final product.

Furthemore, apparatus employed in the past have had a relatively low output per unit time, especially with respect to the molding of plastic articles such as sound records. This is true, among other reasons, because of human error in the control of these machines.

In the molding of plastics, a number of factors influence the speed and efficiency of the molding press, for example, the nature of the plastic, the nature of the heating and cooling media and their initial temperatures, room temperature, etc. Water may be employed as a cooling medium and the temperature thereof may vary from day to day, which may radically influence the molding cycle. Heretofore highly skilled technicians have been necessary for the proper co-relation of and compensation for changes in the factors which influence the molding cycle. This has involved expense because of the necessity to cease temporarily the operation of the apparatus in order to recalculate the control factors for the cycle whenever a change is necessary. No apparatus has been heretofore proposed which lends itself to systematizing the reorientation of these factors caused by a variation in any one thereof. It is desirable to re-orient quickly these control factors of the molding cycle in the event any one or more is subject to change. Prior apparatus have not had this flexibility.

Also past devices have not taken full advantage of the relative positions of the dies or molds for cycle control, and inventors in the prior art have not had full appreciation of the importance of careful control of the various factors influencing the mold cycle by means of relative position of the jaws of the press.

According to the present invention, apparatus is provided for controlling the molding cycle of a plastic press which will eliminate the above-noted difficulties.

The above and further novel features and advantages of the invention will more fully appear from the detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings:

Fig. 1 is a schematic representation, with parts broken away, of one form of the invention employed in connection with a press for forming sound records;

Fig. 2 is a schematic wiring diagram of a portion of the novel press controlling means;

Fig. 3 is a detailed front elevation of the press control means shown in Fig. 1;

Fig. 4 is a rear view, with parts broken away, of the structure shown in Fig. 3;

Fig. 5 is a rear view of a press controlled cam plate employed in the present invention;

Fig. 5a is a fragmentary view of a portion of the press control cam shown in Fig. 5 indicating a slightly different arrangement of the camming surfaces thereof as compared to Fig. 5.

Fig. 6 is a sectional view taken on line 6—6 of Fig. 5;

Fig. 6a is a side view of a cam button having an inclined face;

Fig. 7 is a sectional view taken on line 7—7 of Fig. 4 showing a motor and clutch structure (omitted from Fig. 4) used in the present invention.

Fig. 8 is a sectional view taken on line 8—8 of Fig. 4 with certain parts omitted for purposes of clarity;

Fig. 9 is a sectional view taken on line 9—9 of Fig. 4; and

Fig. 10 is a rear view of a time controlled second cam plate employed in the invention.

The novel invention in one aspect thereof, comprises in combination a press for molding a plastic article, said press having relatively movable jaws which are adapted for opening and closing, there being a pair of dies mounted one upon each of said jaws. A plurality of means for governing desired mold cycle control factors are provided, such means including, for example, means for heating the dies, cooling the dies, and controlling the relative positions of said jaws and the pressure exerted thereby. Separate devices are provided for actuating separately each of the above means. The gist of the invention consists in the provision of mechanism for actuating each of or one or more said devices in any desired order in response to closing or opening movement of the jaws, and operatively connecting to said mechanism an automatic timer which may take charge of the molding cycle at any time and preferably when appreciable relative movement of the jaws can no longer take place whereby the timer can actuate each of said control devices in any desired order intermittently or continuously and for any desired time interval.

In the form of the invention shown in the drawings, a press 10, which is governed by the novel mold cycle control means, is designed, for example, for pressing sound records and is of conventional design, having one stationary jaw 11 and one movable jaw 12. Mounted respectively upon the jaws 10 and 12 are dies 13 and 14, and mounted respectively upon these dies are suitable record molds 15 and 16. So-called "landing blocks" or limit stops 13a, 14a are secured respectively to dies 13, 14 for the purpose of limiting the extent to which the jaws may close. The record molds 15 and 16 may be of the type shown and described in my Patent No. 2,346,760 entitled "Wave Record Mold" granted April 18, 1944. A single equalizer ridge 16a may be formed upon the mold 16.

Mold cycle factors employed for governing the formation of plastic articles, such as a record, in the form shown, comprise a heating factor, a cooling factor, waste and recirculation factors, and factors pertaining to the controlling of the pressures exerted by and the relative positions of the jaws of the press and, of course, the dies and molds mounted thereon. It is desirable in the embodiment of Fig. 1 to employ a heating medium, such as steam for the dies, which may be generated in a suitable boiler 17, having associated therewith an injector 18, which is used in connection with the recirculation of steam in a manner to appear hereinafter.

Steam is conducted to the dies 13 and 14 by means of a conduit 19, which is in communication with a conventional Y type of conduit, having flexible legs 20 and 21 and a common inlet at 22. The legs 20 and 21, respectively, are connected to the dies 13 and 14. A conventional electrically operated solenoid valve 23 is interposed in the conduit 19 for governing the flow of steam therethrough.

Any suitable cooling medium may be employed for chilling the dies 13 and 14 and molds 15, 16, for example, a fluent medium such as water is desirable and may be conducted to the dies from a suitable source (not shown) by means of a conduit 24, which is in communication with the common inlet 22 for the conduits 20 and 21. A solenoid valve 25 is interposed in the conduit 24, said valve being similar to valve 23. The heating and/or cooling media exhausted from the dies 13 and 14 is preferably directed into a Y type flexible exhaust conduit 26, having a common conduit leg 27. The latter is in communication with a conduit 28, which is directed to, for example, a sewer. A waste control valve 29, preferably of the electrically operated solenoid type, is in the conduit 28.

For purposes of economy of heat, it is desirable to recirculate the heating medium back to the source thereof, and a conduit 30 is provided therefor, which at one extremity thereof is in communication with the conduit 27 and at the other extremity with the injector 18, the latter acting to remove any foreign matter or condensate. The injector is connected to the boiler 17 by a conduit 18a. An electrically operated solenoid valve 31, analogous to valves 23, 25 and 29, is employed for controlling a flow through conduit 30.

Conventional means for controlling the opening and closing of the press jaws 11 and 12 are schematically illustrated in Fig. 1 and comprise, for example, an hydraulic control device having a power cylinder 32 in which a piston 33 is movable and is connected to, for example, the lower jaw 12 by means of a piston rod 34. A suitable pressure medium, such as oil, may be employed and is led to the power cylinder 32 by means of a conduit 35 which is in communication with a control valve 36. Conduits 37 and 38, respectively, interconnect the upper and lower chambers of the power cylinder 32 to the valve 36. A valve handle 39 is attached to the valve 36 which can be controlled by suitable mechanism whereby the jaws of the press can be automatically closed, opened, or the pressure increased or decreased. A device for accomplishing this is indicated generally at 40 (Fig. 1), which device is under the influence of certain controlling cams as will appear more fully hereinafter. Said device 40 is schematically indicated in more detail in Fig. 2, wherein a solenoid 40a is employed for urging the handle 39 and valve 36 to the so-called "press up" (low pressure) position, a second solenoid 40b is employed for urging the valve to the "press down" position, and a solenoid 40c also is employed for moving the valve to "press up" (high pressure). A common core 39a for these three solenoids is provided which is pivotally connected to handle 39.

The novel control means for governing the molding cycle comprises in general a plurality of devices for controlling the above-described valves in response to closing movement of the jaws 11 and 12, and in response to time. Separate means are provided for governing said valves for desired periods and in a predetermined order with respect to time, that is, the relative positions of the press jaws govern one portion of the cycle and another portion is governed by a timer.

To effect this control, a pair of cams 41, 54 are provided (Fig. 1). These cams are also shown in Fig. 4. Cam 41 comprises a press controlled cam which is responsive to relative movement of the jaws of press 10 and, for example, is positioned by the piston 33 (Fig. 1).

The cam 41 is preferably a flat plate. It is formed in this shape because it is convenient to insert therein suitable cam buttons whereby certain switches may be actuated for governing the above-described valves. As shown in Fig. 4, a plurality of switches, for example eight, are provided for co-acting with the cam 41. These switches preferably are of the conventional so-called micro-switch variety and are indicated at 42–49, inclusive.

The press controlled cam 41 is sometimes hereinafter referred to as the "press cam" and has formed therein rows of perforations 41a–41h (Fig. 5), inclusive, respectively opposite to switches 42–49, inclusive. As viewed in Figs. 1, 4 and 5, these rows of perforations are vertical and each perforation is adapted for receiving a button 50 (Fig. 6). Thus it is possible to install in any row of perforations a continuous or interrupted row of buttons whereby the micro-switch co-acting therewith may be continuously or intermittently actuated. In the form shown, there are twenty-three perforations in each row.

A desired form of button 50, as illustrated in

Fig. 6, comprises a head portion adapted for contacting a micro-switch and a suitable shank adapted for insertion into a cam perforation and to be held therein by friction. The button may have a face $50a$ inclined at any desired angle (Fig. 6a) to attain a desired adjustment of micro-switch control.

The plate cam 41 is held in slidable relationship to the micro-switches 42–49, inclusive, by means of arms 51, 52 (Fig. 4), having grooves $51a$ and $52a$ therein, respectively, for receiving the vertical edges of the plate cam. The arms 51 and 52 are secured to a base plate 53 (Figs. 3 and 4) upon which the time control cam 54, to be described hereinafter, is also slidably supported.

In order to prevent the press cam from falling out of the grooves in arms 51 and 52, suitable limit stops $41i$ and $41j$ (Fig. 5) are secured adjacent the upper edge of the cam.

As shown in Fig. 1, the press cam 41 is operatively associated with the piston 33 and is adapted for movement in response to the opening and closing of the jaws 11 and 12 of the press 10. It is possible, if desired, to make a direct interconnection between the cam 41 and a jaw, such as 12. The several micro-switches 42–49, inclusive, thus are actuatable in response to the disposition of the buttons 50 in the corresponding rows of cam perforations. Each micro-switch is provided with a suitable roller as shown in Fig. 4 as at $42a–49a$, inclusive, for contacting the buttons. In order to provide a visual indication whether or not the micro-switches are closed, a small electric light may be connected to the circuit of each switch. Such lights are indicated as at 55–62, inclusive (Fig. 4), which are inserted respectively into the circuits of switches 42–49, inclusive. Each of these lights is preferably situated behind or in the rear of the base plate 53 as shown in Fig. 8, and each is provided with a suitable small snap switch as at $55a$ (Fig. 8). Also each light may be viewed through a suitable glass port as at 63 (Fig. 8), there being one port for each light.

Adjustment up or down of the positions of the switches 42–49 relative to cam 41 and base plate 53 can be made by means of, for example, adjustment screws $42b$ in slots $53a$ (Fig. 3).

A schematic wiring diagram for those switches controlled by the press cam is indicated in Fig. 2 wherein each pair of leads for each individual switch 42–49, inclusive, is connected in a conventional manner across suitable power leads 64, 65 connected to a power source (not shown) at $L_1$, $L_2$. Fig. 2 indicates the association of switch 42 with the solenoid valve 23 which controls the flow of heating medium. Switch 43 is connected to the solenoid valve 29 and switches 44 and 45 are respectively connected to the solenoid valves 25 (chill) and 31 (recirculation). The following three micro-switches 46, 47 and 48 are connected to the control device 40 for the hydraulic valve 36 which governs the position of the jaws of the press. Said switches 46, 47 and 48 are respectively connected to the above-described solenoids $40a$, $40b$ and $40c$, which in turn respectively control the position of said handle 39: (1) in the "press up" low pressure (position C) (Fig. 2); (2) the "press down" (position A) which reverses the flow of the pressure medium and opens the press; and (3) the "press up" high pressure (position D) wherein the pressure exerted by the press may be increased, for example, from 100 pounds per square inch up to 2,000 pounds per square inch. Handle 39 is in a neutral position when at position "B" as shown in broken lines in Fig. 2.

The micro-switch 49 is connected to a solenoid 66 (Figs. 2 and 7) for controlling the operation of a timer to be described more fully hereinafter.

It will be apparent that each of the above-controlled factors for the mold cycle may be governed in any desired order and may be brought into action jointly or severally or intermittently. The motion of the press cam 41, in the embodiment shown, is upward for that portion of the cycle which is governed by this particular cam.

In Fig. 1, in order to simplify the drawings, the interconnections between the several micro-switches 42–49, inclusive, and the solenoids which they respectively control is shown by a single line for each switch.

The above-mentioned time cam 54 is mounted for sliding vertical movement relative to the base plate 53 in a manner identical to that of the press cam 41 and is held for such vertical movement, as viewed in Figs. 1 and 4, by means of the arms 67 and 68, having grooves $67a$ and $68a$ therein, respectively. The time cam 54, instead of being moved in response to relative motion of the jaws of the press 10, is moved in response to time, that is, it is moved at a constant rate.

Means are indicated in Fig. 7 for slowly moving the time cam 54 comprising a constant speed motor 69 which may turn, for example, at 23 R. P. M. This motor is connected to a suitable source of electric energy (not shown) and preferably rotates continuously. It is brought into and out of operative association with the time cam 54 by means of the above-mentioned solenoid 66, which is adapted for pivoting a base plate 70, upon which the motor is mounted, about a pivot pin 71 whereby a worm gear 72, which is driven by the motor 69, is brought into and out of engagement with a worm wheel 73. A spring $66a$ secured to solenoid plunger $66b$ normally holds the worm 72 out of engagement with wheel 73 when the solenoid is not energized. The wheel 73 is secured to a shaft 74 and has secured thereto a pinion 75 (Fig. 9) which co-operates with a rack 76. The latter is secured to the time cam 54, preferably in the center thereof as in Fig. 4. Thus rotation of the worm wheel 73 can raise or lower the time cam 54. The worm gear 72 is interconnected to the motor 69 by means of suitable bevel gears 77 (Fig. 7).

The time cam 54 is analogous to the press cam 41 in that it also is provided with a plurality of rows of perforations as at $54a–54i$, inclusive (Figs. 4 and 10), into which the buttons 50 may be secured for the actuation of a plurality of micro-switches.

The time cam 54, in the embodiment shown, is adapted for controlling a number of micro-switches in a manner similar to the press cam 41. These micro-switches are indicated at 78–86, inclusive. Each of the latter group of switches, excepting switches 85 and 86, is connected respectively to the same element as are switches 42–48 of the press cam 41. That is, switch 78 is adapted for controlling the heat valve 23, the switch 79 is adapted for governing the waste valve 29, and so on.

However, switch 85 controls a solenoid 87 (Fig. 2) which is adapted for positioning handle 39 in the neutral position "B." Switch 86 is a so-called "press cam cut out" switch which governs mechanism for electrically disconnecting the press cam switches 42—48. Such mechanism comprises, for example, a solenoid 88 (Fig. 1) which controls a switch 89 in the power line for the press cam switches 42—48. After completion of a cycle it is desirable for time cam 54 to remain in an elevated position until the press cam has returned to its initial or lowermost position. This is accomplished by means of a solenoid detent 90 (Fig. 7) which is jointly controlled by press cam cut out switch 86 and a switch 91. The latter switch is normally closed but is opened in response to press cam 41 moving to its lowermost position. The former switch, when closed, energizes solenoid 90 (provided switch 91 is also closed) and thereby moves a plunger detent 90a into engagement with a latch 66b on plunger 66b. Thus the worm 72 and wheel 73 will remain in engagement and the time cam will remain in its elevated final position until the opening of switch 91, despite deenergization of solenoid 66.

In Fig. 1 a lump or biscuit of plastic 92 upon the mold 16 is prepared for pressing, for example, into a record by means of the above-described apparatus. The plastic biscuit may be of shellac or vinyl acetate or any suitable plastic substance.

One example of the operation of the novel apparatus is as follows:

We will assume for purposes of this example that the temperature of the cooling water is approximately 55° F., that the steam temperature is approximately 1200° F. at a pressure of 120 pounds per square inch, the room temperature is 72° F. and that the plastic biscuit is composed of vinyl acetate. Initially the hand control valve 39 is thrust by hand from the neutral position "B" (Fig. 2) to the so-called "press up" position shown at C. This starts the press upon its upward movement whereupon the press cam 41 will be moved in response thereto. It is desirable to hold the valve 39 in the "press up" position only long enough to permit the solenoid 40a to take control by virtue of the actuation of micro-switch 46. This is accomplished by inserting a row of buttons in the row of perforations 41e (Fig. 5). So long as micro-switch 46 is closed, the jaw 12 and the die 14 will move upwardly until, of course, the limit of motion is reached, whereupon the pressure medium within the cylinder 32 is by-passed in a conventional manner.

Simultaneous with the closing of switch 46 and the opening of valve 36 to "press up," the heating valve 23 is opened. This is accomplished by inserting a row of buttons 50 in row 41a. It is desirable to empty the dies 13 and 14 of any water or cooling medium which may have collected therein. This is done by opening the waste valve 29 and permitting the steam to blow same into the sewer. Consequently, simultaneous with the opening of heat valve 23, it is desirable to open the valve 29 by actuating the micro-switch 43 for a short time at the outset. This, of course, is done by inserting a group of buttons, as shown (Fig. 5), into the row 41b. The length of time that the waste valve is open is a function of the speed of the press and the length of the continuous row of buttons in the perforations 41b. It is necessary to open the waste valve 29 for only a short period in order to clear the dies of collected water.

Thereafter it is desirable to recirculate the heating medium back to the boiler by closing valve 29 and opening the recirculating valve 31. The waste valve 29 is closed by terminating the row of buttons 41b, for example, at the fifth button from the top as viewed in Fig. 5. Immediately thereafter, in row 41d, buttons should be inserted, for example, commencing with the sixth perforation from the top (Fig. 5) and this row of buttons should be continuous down to the point where it is desired to close the recirculation valve.

During the closing movement of the press the dies are heated to the desired temperature by virtue of the live steam which is circulated therethrough. It is preferable to heat the dies during this period in order to save time and to avoid the necessity for pre-heating same.

Suppose it is desired to increase the pressure upon the biscuit near the end of the upward stroke of the jaw 12. A cam button can be inserted in, for example, the third perforation from bottom in row 41g (Fig. 5). A cam button in the corresponding perforation in row 41e should be removed to avoid simultaneously energizing both solenoids 40a, 40c.

When the upper die 15 contacts the biscuit 86, the plastic is in semi-molten condition. The press squeezes the plastic and causes it to flow between the faces of the dies.

At approximately this critical point in the pressing, where vinyl acetate is used, it is desirable to cut off the heat and shortly thereafter to introduce the cooling medium. It has been found that satisfactory results are obtained if the heating medium is cut off when the plastic begins to flow over the ridge 16a, that is, when the "flash" first appears. This point can be accurately determined and the valve 23 can be closed precisely thereby terminating the row of buttons in row 41a which co-act with the micro-switch 42. For example, the last button in the row can be omitted.

It is conceivable that under some circumstances and possibly with other types of material it may be desirable to employ a different arrangement of the buttons as illustrated in Figs. 5 and 10 with respect to the control of the heating and chilling. For example, it may be desirable to arrange the cam buttons 50, as shown in Fig. 5a, wherein the heating medium is cut off near the end of the movement of the press cam 41 as by removing the buttons in the two lowermost perforations in perforation column 41a. Thereafter the chilling cycle may be initiated by the press cam, if desired, by inserting a cam button 50 in, for example, the lowermost perforation in the column 41b.

If it is desired for any purpose to oscillate the press upwards and downwards during this initial pressing portion of the cycle, for example, if a "breathing" period is necessary, this may be effected by properly positioning one or more cam buttons in the perforations 41f.

Immediately upon the closing of the heating valve 23 by opening the switch 42, the time portion of the cycle may commence. Consequently immediately on closing said valve 23 it is desirable to energize the solenoid 66 (Fig. 7) whereby spring 66a is overcome. Thus the timer motor 69 is urged into an active position connected to worm wheel 73, and the upward movement of the time cam 54 is commenced. A cam button is positioned for this purpose in the bottom perforation of row 41h.

The buttons 50 are disposed upon the time cam 54, for example, as shown in Fig. 10, whereby the cooling valve 25 is opened preferably a short interval after the closing of the heating valve 23, the cooling valve being opened by means of cam buttons in row 54c, the first button, for example, being placed in the second perforation from the top. The length of said interval is only long enough to insure that steam is not permitted to overcome the pressure in the water system. Thus, the small amount of steam which is trapped within the dies is permitted to dissipate its pressure until it is below the pressure of the cooling medium and at that point the cooling valve 25 is opened. Simultaneous with the opening of the valve 25, the recirculation valve 31 is closed by a termination of the row of cam buttons in row 54d, and the waste valve 29 is opened by cam buttons in row 54b. Thus the chilling portion of the cycle commences and the cooling medium is conducted to the sewer.

In the present example wherein a vinyl acetate record is being pressed, it is desirable to hold the cooling valve 25 open for a period of, for example, from 20 to 25 seconds. The cooling of the mold theoretically causes the plastic to shrink away therefrom.

Immediately upon completion of the chilling or cooling of the dies, it is desirable to close the micro-switch 83 whereby the jaws of the press are opened and the pressed record may be withdrawn. The opening of the press, of course, is accomplished by inserting a proper number of buttons in the row 54f (Fig. 10).

In order to avoid a reverse action of the press cam 41 when it is thrust downwardly in response to the opening of the press by the time cam, the solenoid 88 (Fig. 1) is energized in response to closing of switch 86 and switch 89 is opened to interrupt a flow of current to the switches 42—49. This current interruption deenergizes solenoid 66. Ordinarily the time cam would fall at this point but for the intervention of solenoid detent 90 which holds the worm 72 and worm gear 73 in engagement while the press cam is falling. This is done by virtue of said press cam cut out switch 86 which serves the dual purpose of energizing both solenoids 88 and 90.

A suitable "time cam cut out switch" can be provided for disconnecting all time cam microswitches from their power source in order to prevent reverse action of these switches when the time cam comes down. Such a cut out switch, for example, can be actuated in response to the falling of the press cam to its lowermost position.

A second example of the control of a mold cycle by the novel apparatus, which illustrates the flexibility of this device, is applicable, for example, to the molding of two thin sheets of acetate upon a cardboard base. That is, a piece of cardboard is sandwiched in between surrounding sheets of acetate. The problem of molding this type of record is somewhat different from that above described in that not as much plastic is employed and it is desired to flatten out two thin sheets of plastic and to elongate them rather than to flatten a biscuit of plastic.

The initial portion of the cycle, as controlled by the press cam, can be identical to that above described, except that shortly before the landing blocks 13a, 14a contact one another the heat should be cut off, that is, the heating valve 23 should be closed.

Immediately after the closing of the heating valve 23, the time control cam 54 should take charge of the cycle, that is, the solenoid 66 should be actuated in response to a closing of the switch 49. An interval of, for example, from 3 to 9 seconds, is interposed between the shutting off of the heating medium and the introduction of the coolant. Thereafter the time controlled portion of the cycle may be identical to that above described.

A third example of the operation of the invention concerns the molding of plastic upon glass, that is, a layer of plastic pressed against a layer of glass. This example differs from the others in that glass cannot be chilled at the same rate as the plastic. The latter is able to take a rapid chill but the glass must be gradually cooled. Consequently, it is desired to control the chilling by means of the time cam. The initial portion of the cycle may be controlled by the press cam 41 in the manner above described. However, the chilling must be carefully controlled by the time cam by running the cooling medium through the dies, for example, for 10 seconds, and thereafter cutting off the cooling medium say for another 10 seconds. Thereafter the heating medium may be run into the dies for an added 10 seconds and the cycle may be repeated until a desired reduced temperature of the glass is obtained. Thus a graphic showing of temperature reduction of the glass and the plastic assumes the shape of steps rather than a steep downward curve.

Of course, a wide variation of different cycles may be achieved by the above-described invention. For example, instead of actuating the time cam at the end of the portion of the cycle controlled by the press cam 41, it is possible to start the timer at any time and the various control factors of the mold cycle may be governed both by the timer and the press cam 41 acting jointly or simultaneously. However, there should be no conflict in the actuation of a given control valve or control device as between the time cam and the press cam. Normally, it is desired to start the time cam in operation when there is no further useful relative movement possible with respect to the jaws of press 10.

During the cooling or curing part of the cycle it is possible to introduce the so-called "breather" wherein the press is open slightly for a predetermined time and thereafter closed. It is obvious how this may be accomplished by the introduction of the buttons 50 into the proper perforations in the time cam 54.

While the invention has been described with respect to certain preferred examples which have given satisfactory results, it will be understood by those skilled in the art that various changes and modifications may be made without departing from the spirit and scope of the invention, and it is intended, therefore, in the appended claims to cover all such changes and modifications.

What is claimed is:

1. In a plastic mold cycle control device, a press having a pair of relatively movable jaws adapted for opening and closing, a pair of dies mounted one upon each of said jaws, means for heating said dies, means for cooling said dies, press control means for controlling the relative position of said jaws, devices for actuating said press control means and at least one of said other means, a mechanism for actuating said devices in any desired order in response to movement of said jaws towards a closed position, a timing mechanism for actuating said devices in response to time in any desired order, and means for operatively interconnecting said mechanisms whereby one may actuate the other at a selected point in the cycle of operation thereof.

2. In apparatus of the class described, a pair of press elements, power means for moving said elements relative to one another, mechanism operable in response to the positioning of said elements under the influence of said power means at preselected distances relative to one another for controlling a flow of heating medium through said elements, mechanism responsive to time for controlling a flow of heating medium through said elements, mechanism responsive to time for controlling a flow of cooling medium through said elements, and means for operatively interconnecting said press responsive mechanisms to said time responsive mechanisms.

3. In apparatus of the class described, a press having a pair of relatively movable jaws adapted for opening and closing relative to one another; means for heating said jaws; means for cooling said jaws; means for controlling the relative position of said jaws; a plurality of electrical control devices for said means, there being one such device for each of said means; a press cam operable in response to movement of one of said jaws relative to the other; means for operatively associating said cam selectively with one or more of said control devices whereby the actuations of the latter are governable in response to the positioning of said jaws at preselected distances relative to one another; a time cam; mechanism for moving said time cam in response to time; and means for operatively associating said time cam selectively with one or more of said devices and with said press cam whereby the actuations of said devices are governable in response to time.

4. In apparatus of the class described, a press having a pair of relatively movable jaws for use with power means and adapted for opening and closing under the influence of the power means; means for heating said jaws; means for cooling said jaws; means for controlling the power means; a press cam positionable in response to relative movement of said jaws, said press cam including mechanism for adjusting the contours thereof; devices associated with said press cam and cam mechanism for governing all said means in response to said jaws being positioned at preselected distances relative to one another; a time cam; a time cam mechanism for moving said time cam at a selected speed, said time cam including mechanism for adjusting the contours thereof; devices associated with said time cam and its associated cam mechanism for governing said means in response to time; mechanism for operatively interconnecting said cams whereby the press cam can control the actuation of the time cam; and mechanism for operatively interconnecting said cams whereby the time cam can govern the actuation of said press cam.

5. In apparatus of the class described, a pair of press elements for use with power means for moving said elements relative to one another, mechanism actuatable in response to the movement to preselected distances of one of said elements relative to the other for controlling a flow of heating and cooling media through said elements, and mechanism responsive to time for controlling the power means and also the flow of heating and cooling media through said elements.

6. In a plastic molding apparatus the combination comprising, a press having a pair of jaws movable relative to one another for use with a pair of dies mounted one on each of said jaws, power means for opening and closing said jaws, means for heating the dies, means for cooling the dies, a devices for controlling a flow of heating and cooling media to the dies in response to predetermined relative movements of the dies, a time responsive device for controlling a flow of heating and cooling media in response to time, mechanism for actuating said time responsive device in response to predetermined relative movement of said jaws, and mechanism responsive to said time responsive device for opening said jaws after a selected time interval.

7. In apparatus of the class described, a press including a pair of dies movable toward and away from one another and adapted for use with a power device for urging said dies toward and away from one another, a source of fluent cooling medium, a source of fluent heating medium, mechanism actuatable in response to the movement of one of said dies to preselected distances relative to the other die for controlling the flow of said media through said dies, time responsive mechanism actuated by said last-named mechanism for controlling in response to time the duration of the flow of said media through said dies, and devices for operatively interconnecting the time-responsive mechanism to said power device for opening said press after a predetermined time.

8. In a plastic molding press of the class described, a pair of dies mounted for relative movement for molding a plastic article, a power device for moving said dies relative to one another thereby opening and closing same, die cooling means for flowing a cooling medium through said dies, die heating means for flowing a heating medium through said dies, a cooling valve for controlling the flow of said cooling medium, a heating valve for controlling the flow of said heating medium, a die controlled cam movable in response to relative movement of said dies, an operative connection between said cam and heating valve for opening the valve in response to initial closing movement of the dies and closing the valve in response to a predetermined extent of relative die movement, a time controlled cam, means for moving the latter in response to time, an operative connection between said die controlled cam and said time controlled cam whereby the latter is actuatable in response to a predetermined relative movement of said dies, an operative interconnection between said time controlled cam and said cooling valve for opening said cooling valve for a predetermined period, and an operative interconnection between said time controlled cam and said power means for opening said dies a predetermined time after the cooling of the dies.

9. In apparatus of the class described, a press comprising a pair of jaws movable relative to one another, a pair of dies mounted one on each of said jaws, said press being adapted for use with power means for opening and closing said jaws, conduits connected to said dies for conducting heating and cooling media thereto and therefrom, a heating valve for controlling a flow of heating medium from a source thereof to said conduits, a cooling valve for controlling a flow of a cooling medium from a source thereof to said conduits, a press controlled device responsive to the movement of one of said jaws to preselected distances relative to the other jaw for governing said valves after the actuation of the power means to close said jaws, said press controlled device being adapted for opening said heating valve when said jaws are within preselected distances from one another and thereafter closing same, and a time responsive device operatively connected to said valves and power means for governing same, the time responsive device being actuatable by the press-controlled device and adapted for opening said cooling valve for a predetermined period and thereafter for actuating said power means for opening the press.

10. In apparatus of the class described, a press including a pair of dies movable relative to one another; power means for opening and closing said dies; means for heating said dies; means for cooling said dies; control means for said power means; a press controlled device movable in response to movement of one of said dies to preselected distances relative to the other die for governing said means; a time responsive device for governing said means; and mechanism for operatively interconnecting the press and time controlled devices whereby one is operable by the other.

11. In apparatus of the class described for use with a source of heating medium and a source of a coolant, a pair of dies; a press for use with power means, said press comprising a pair of jaws for supporting said dies, said jaws being movable relative to one another under the influence of the power means; conduit means through said dies having an inlet and an outlet, the inlet being connectable to the source of heating medium or to the source of coolant; a heating valve for controlling a flow of heating medium from the source thereof to such inlet; a cooling valve for controlling a flow of coolant from the source thereof to such inlet; an exhaust valve connected to such outlet; a recirculation valve also connected to such outlet and to the source of heating medium; and a press cam movable in response to movement of one of the jaws of said press relative to the other jaw, said cam including cam elements which are adjustably positioned thereon, and having devices operatively connected thereto for governing the opening and closing of preselected of said valves in predetermined order.

12. In apparatus of the class described for use with a source of heating medium and a source of a coolant, a pair of dies, a press for use with power means, said press comprising a pair of jaws for supporting said dies, said jaws being movable relative to one another under the influence of the power means; conduit means through said dies for conducting fluid therethrough, said conduit means having an inlet and an outlet, intervening portions of said conduit means between the inlet and outlet passing through said dies; a heating valve for controlling a flow of heating medium from the source thereof to such inlet; a cooling valve for controlling a flow of coolant from the source thereof to such inlet; and a press cam movable in response to the movement of one of the jaws of said press relative to the other jaw, said cam having devices operatively connected thereto for governing the opening and closing of said valves in preselected order.

13. In apparatus for use with a pair of molds, a pair of dies adapted for supporting respective of said molds; a press adapted for use with power means, said press comprising a pair of jaws for supporting respective of said dies, said jaws being movable relative to one another under the influence of the power means; conduit means through said dies, said means having an inlet and an outlet and portions thereof intermediate the inlet and outlet passing through said dies; a valve for controlling a flow of heating medium to such inlet; a cooling valve for controlling a flow of coolant to such inlet; a press cam movable in response to the movement of the jaws thereof relative to one another; and a plurality of devices actuatable by said press cam in response to the movement thereof for selectively governing said valves.

14. In apparatus for use with a pair of molds, a pair of dies adapted for supporting respective of said molds; a press adapted for use with power means, said press comprising a pair of jaws for supporting respective of said dies, said jaws being movable relative to one another under the influence of the power means; conduit means through said dies, said means having an inlet and an outlet and portions thereof intermediate the inlet and outlet passing through said dies; a valve for controlling a flow of heating medium to such inlet; a cooling valve for controlling a flow of coolant to such inlet; a press cam; means for moving said press cam in response to the movement of the jaws of said press relative to one another; a plurality of devices actuatable by said press cam in response to the movement thereof for governing said valves; and mechanism responsive to time for controlling the power means and also for controlling the flow of heating medium and coolant through said conduit means.

JACKSON O. KLEBER.

REFERENCES CITED

The following references are of record in the file of this patent:

UNITED STATES PATENTS

| Number | Name | Date |
|---|---|---|
| 1,251,851 | Wickes | Jan. 1, 1918 |
| 2,204,531 | Erbguth et al. | June 11, 1940 |
| 2,373,201 | Smith | Apr. 10, 1945 |
| 2,432,215 | Stocker | Dec. 9, 1947 |
| 2,487,126 | Greer | Nov. 8, 1949 |